Sept. 2, 1947.   W. L. BAKER ET AL   2,426,584
DATA SMOOTHING AND POSITION PREDICTING APPARATUS
Filed Feb. 16, 1944
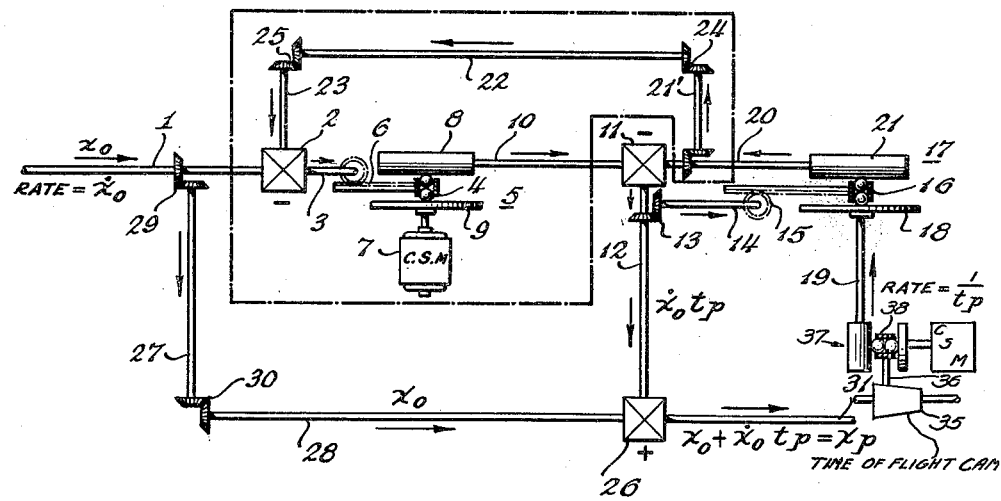
INVENTORS
W. L. BAKER
D. J. CAMPBELL
A. P. GOOD
BY
ATTORNEY Patented Sept. 2, 1947

2,426,584

UNITED STATES PATENT OFFICE 2,426,584

DATA SMOOTHING AND POSITION PREDICTING APPARATUS

Willard L. Baker, Ipswich, Mass., and David J. Campbell, Richmond Hill, and Albert P. Good, Mamaroneck, N. Y.; said Campbell and said Good assignors to Sperry Gyroscope Company, Inc., a corporation of New York, and said Baker assignor to United Shoe Machinery Corporation, Flemington, N. J., a corporation of New Jersey Application February 16, 1944, Serial No. 522,676

6 Claims. (Cl. 235—61.5)

This invention relates generally to the art including calculating devices, and more particularly, to a smoothing differentiating, and predicting circuit particularly adapted for use in gunfire control systems.

A more or less independent problem to be solved in all fire control mechanisms is that of obtaining a measure of the value of prediction, that is, the change in the target position during the time of flight of the projectile. For this purpose, instantaneous measures of target position coordinates are continuously obtained either from radio or optical tracking and range finding equipment, and a measure of the projectile time of flight is also derived from suitable ballistic apparatus. The predicting mechanism then operates, firstly, to differentiate each of the present position coordinates, thereby obtaining a measure of the instantaneous rate of movement of the target in each of these coordinates, secondly, to multiply these measures of rate by the time of flight to obtain prediction in each of these coordinates, and finally, to add the respective prediction components to the respective present position coordinates to obtain the respective coordinates of the future, or predicted, position of the target, that is, the position in space which the target will occupy at the expiration of the projectile time of flight.

In prior predicting mechanisms, such as that disclosed in U. S. Patent No. 2,206,875, for Fire control device, issued July 9, 1940, in the names of E. W. Chafee and B. A. Wittkuhns, the processes of differentiation and multiplication are performed simultaneously in one unit, the unit comprising essentially a single variable speed device and a differential cooperating together in a manner later to be described in detail. Such prior predicting units are subject to two outstanding inherent defects or errors. One of these errors arises from the fact that the time of flight is continuously changing during normal operation, and the other arises from the fact that the present position input data is never a perfect measure of the true present position of the target, but instead has superimposed thereupon certain false and erratically varying perturbations. These false variations are due to the fact that it is impossible to obtain absolutely perfect tracking of the target, back-lash in the gearing between the tracking equipment and the predicting mechanism, and other causes. By the present invention, both of these errors which arise in prior predicting apparatuses are substantially reduced.

Accordingly, the primary object of the present invention is to provide novel and improved predicting apparatus for fire control systems.

Another object of the present invention is to provide predicting apparatus in which no lag in prediction is introduced by virtue of a constantly changing time of flight.

Still another object of the present invention is to provide a differentiating circuit wherein spurious perturbations on the input signal to be differentiated are automatically ignored by the apparatus in order to thereby provide a smooth measure of the rate of change of said input signal.

A further object of the present invention is to provide novel and improved predicting apparatus employing two variable speed devices one being for smoothing input data and the other for obtaining prediction.

Other objects and advantages will become apparent from the specification, taken in connection with the accompanying drawing wherein the invention is embodied in concrete form.

The single figure of the drawing is a schematic representation of the predicting circuit of the present invention.

In the drawing, shaft 1 is the present position input shaft, the angular displacement of which is proportional to any coordinate of the present position of the target, the coordinate being indicated in this case as $x_0$. This coordinate ($x_0$) will be understood to represent either a rectangular coordinate or an angular coordinate of the present position of the target, depending upon the system of coordinates in which prediction is to be performed in the particular fire control system to which the invention is applied.

It will be assumed throughout, for the purpose of describing the invention, that the actual present position coordinate ($x_0$) of the target position is changing at a constant rate ($\dot{x}_0$). This assumption is met in practice in cases where the target being tracked is moving along a straight line with constant speed and where $x_0$ represents a rectangular coordinate.

Shaft 1 provides one input to a differential 2, the output of which, appearing on shaft 3, is schematically indicated as controlling the position of a ball carriage 4 of a variable speed device 5, through rack and pinion gearing 6. Variable speed device 5 is of the well-known type, wherein the movement of a disc 9, which is driven at a constant speed from a suitable constant speed motor 7, is variably transmitted to the output cylinder 8, the transmission ratio depending upon the displacement of ball carriage 4 with respect to the center of disc 9. Thus, as is well known, the output shaft 10, which is connected to cylinder 8, rotates in a direction corresponding to, and at a rate proportional to, the displacement of ball carriage 4 with respect to the center of disc 9.

Shaft 10 is employed to actuate one input of a second differential 11, the output shaft 12 of which is employed through gearing 13, shaft 14, and rack and pinion gearing 15, to control the position of a ball carriage 16 of a second variable speed device 17. The disc 18 of variable speed device 17 is continuously rotated from shaft 19 at a rate inversely proportional to the projectile time of flight, that is, at a rate proportional to $1/t_p$. Any suitable apparatus may be used for thus rotating the disc, such as that shown in Patent No. 2,206,875. The apparatus for rotating shaft 19 may comprise a time of flight ($t_p$) cam 35, actuated in the known manner, and designed so that the lift of the cam pin 36 thereof is proportional to the reciprocal of the time of flight, and a variable speed drive 37, having a ball carriage 38 which is controlled by the lift pin 36. The cylinder of the variable speed drive rotates at a rate inversely proportional to time of flight, and is shown for purposes of illustration as being coupled directly to shaft 19.

Shaft 20, which is directly driven by cylinder 21 of variable speed device 17, is connected to provide the second input to differential 11. Shaft 20 also provides the second input to differential 2 through shafts 21′, 22 and 23, and the associated bevel gearing 24 and 25. Differentials 2 and 11 both operate as subtracting differentials so that the displacement of their output shafts represents the difference in displacements of their input shafts.

One input of a third differential 26 is actuated in accordance with the present position coordinate ($x_o$) from shaft 1, through shafts 27 and 28, and the interconnecting bevel gearing 29 and 30. As will later be shown, the angular displacement of shaft 12 is proportional to the $x$-component of prediction, which is the product ($\dot{x}_o \cdot t_p$) of the rate of change of the coordinate ($x_o$) by the time of flight. This value of prediction is also introduced into differential 26, where it is added to the present position coordinate ($x_o$) to obtain the future position coordinate ($x_p$) as a proportional angular displacement of output shaft 31.

If the above described predicting circuit were modified to omit the portion enclosed in dash lines so that the left hand side of differential 11 were actuated directly from shaft 1 and the right hand side of differential 11 were actuated directly from cylinder 21, the prior predicting circuit disclosed in the above-mentioned U. S. Patent No. 2,206,875 would be obtained. The operation of this prior predicting circuit will first be described and the errors which are inherent therein will be brought out.

In considering the operation of this prior predicting circuit, the following assumptions will initially be made: (1) that the present position coordinate ($x_o$) is changing at a constant rate and that the target is being perfectly tracked, so that the rate of rotation of shaft 1 is constant; and (2) that the time of flight ($t_p$) is constant so that shaft 19 is rotating at a constant rate.

If the ball carriage 16 is initially in its neutral or zero displacement position when tracking is begun, cylinder 21 and shaft 20 will be initially stationary. Shaft 1 will therefore begin to drive ball carriage 16, through differential 11, in a direction such as to increase the rate of rotation of cylinder 21 and shaft 20. This process will obviously continue until ball carriage 16 has been displaced sufficiently to cause cylinder 21 to rotate at the same rate as shaft 1, at which time a condition of equilibrium will have been reached in which ball carriage 16 will remain stationary.

Since the rate of rotation of the cylinder is always proportional to the rate of rotation of the disc and to the displacement of the ball carriage, and since when equilibrium has been reached, the rate of rotation of the cylinder is equal to that of shaft 1, the following equation may be set up:

(1) $\quad \dfrac{1}{t_p} x$ displacement of ball carriage $\propto \dot{x}_o$

Upon transposition of Equation 1 we obtain, (2) $\quad$ Displacement of ball carriage $\propto \dot{x}_o \cdot t_p$ Therefore, under the condition of equilibrium, the displacement of ball carriage 16, and therefore of shaft 12, provides the required measure of prediction, which may then be added to the present position coordinate ($x_o$) in differential 26 to obtain the future position coordinate ($x_p$) as a proportional angular displacement of output shaft 31.

It will be understood that in the above equations a constant proportionality factor may be present. However, such a proportionality factor has to do merely with the various gear ratios involved, and hence can be disregarded in the theoretical discussion.

As has previously been stated, however, in actual practice shaft 1 is never rotated at an absolutely constant rate even though the present position target coordinate ($x_o$) is changing constantly, but instead has more or less periodic variations superimposed thereon, so that the rate of rotation of shaft 1 is first greater, and then less than, the true rate of change of the present position coordinate. It will be apparent that each time such a variation occurs, the condition of equilibrium of the ball carriage will be disturbed by the automatic operation of the apparatus in attempting to reach a new condition of equilibrium corresponding to the new rate of rotation of shaft 1. In this way, the spurious perturbations superimposed upon shaft 1 will be reflected and appear as corresponding perturbations in the value of prediction as represented by the displacements of ball carriage 16 and shaft 12. Moreover, it can be mathematically shown that these perturbations will appear in the value of prediction in magnified form. As will later be explained, by the present invention, the spurious perturbations in the position of shaft 1 are largely ignored, and their reflection into the computed value of prediction is therefore substantially decreased.

Another defect in the prior predicting circuit arises from the fact that in actual practice time of flight is not constant, as has previously been assumed, but instead is continuously changing. For the purposes of the present discussion it will be assumed that in practice the time of flight changes at a constant rate, which is a much better assumption than that the time of flight is constant.

It will be apparent that as time of flight, and therefore the speed of disc 18, continuously change, the displacement of ball carriage 16 will also continuously change by a compensating amount in an effort to match the speed of shaft 20 with that of shaft 1. However, the only way a change in the displacement of ball carriage 16 can be effected is by having an actual difference between the speeds of shaft 1 and shaft 20. Since the speed of shaft 20 will therefore never exactly match that of shaft 1, Equations 1 and 2 are not absolutely accurate, the result being that the measure of prediction provided as an angular displacement of shaft 12 is slightly in error. This error, which is commonly referred to as "rate lag," may be mathematically shown to be proportional to the rate of change of time of flight. By the present invention this "rate lag" is completely eliminated.

Referring now to the predicting circuit of the present invention, and again assuming for the present that shafts 1 and 19 are rotating at constant rates, it will be apparent that there are two conditions of speed matching which must be met if the ball carriages are to remain stationary: (1) the rate of rotation of shafts 20 and 23 must equal that of shaft 1; and (2) the rate of rotation of shafts 20 and 23 must equal that of shaft 10. If either or both of these conditions are not met, one or both of the ball carriages will be automatically displaced in such a direction as to increase or decrease the rates of rotation of cylinders 8 and 21 as required to meet these conditions. Thus, there will eventually be set up a condition of equilibrium in which both ball carriages are stationary and shafts 1, 10 and 20 are all rotating at the same rate. At this time, Equations 1 and 2 would again be applicable, and the angular displacement of shaft 12 would provide the required measure of prediction as before.

In the present circuit, however, spurious perturbations appearing on input shaft 1 will be reflected into the displacement of shaft 12 to a much lesser extent than in the prior predicting circuit. When a spurious variation in the rate of rotation of shaft 1 appears in the prior circuit, it immediately causes ball carriage 16 to be moved from its correct position at a rate corresponding to the rate of the variation, since the input variation is transmitted directly through differential 11. In the present case, however, when a spurious variation occurs in the rate of rotation of shaft 1, shaft 12 is not immediately and directly affected, since the variation must be transmitted through differential 2 to ball carriage 4, and then through variable speed device 5 and differential 11 to shaft 12. Since variable speed device 5 acts as an integrating device, it is apparent that ball carriage 16 will not be affected as much as ball carriage 4 by high frequency variations in the rate of rotation of shaft 1. By choosing proper proportionality factors throughout, it is possible that shaft 1 will have returned to its normal rate of rotation before any substantial change occurs in the displacement of ball carriage 16, and therefore in the computed value of prediction. Accordingly, in the present invention, a much smoother measure of prediction is provided as an angular displacement of shaft 12.

The operation of the present predicting circuit in eliminating "rate lag" caused by a continuously changing time of flight will now be considered. As before, when time of flight is changing at a constant rate, ball carriage 16 must also move at a constant rate in order to compensate for the change in disc speed and thereby maintain the speed of cylinder 21 and shaft 20 equal to that of shaft 1. However, whereas in the prior circuit this required motion of ball carriage 16 could only be effected by a difference in the speeds of shaft 1 and 20, in the present case, it can be effected by a difference in the speeds of shafts 10 and 20. Thus, with time of flight changing at a constant rate, ball carriage 4 will reach a condition of equilibrium wherein the speed of shaft 10 differs from that of shaft 20 just sufficiently to effect the required compensating rate of motion of ball carriage 16. At the same time, the rate of rotation of shaft 20 will continue to be constant and match that of shaft 1. Accordingly, Equations 1 and 2 can again be set up, and the displacement of ball carriage 16 and shaft 12 will provide a true measure of prediction despite the fact that time of flight is changing.

Although the present invention has been described with respect to a fire control system for the sake of concreteness, it will be apparent that the invention teaches a method of solving a certain type of problem which may arise in various applications other than fire control. It is contemplated that various modifications may be made to the apparatus to adapt it to such applications without departing from the spirit of the invention or the principles embodied therein. For example, it is quite apparent that by the mere expedient of rotating shaft 19 at a constant rate, instead of at a rate inversely proportional to time of flight, a pure differentiating circuit would be obtained wherein the angular displacement of shaft 12 would provide a measure of the time rate of change of any input data which may be provided as an angular displacement of shaft 1.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for obtaining a displacement which is a function of a variable rate of movement which comprises a smoothing variable speed device actuated at constant speed, a prediction variable speed device actuated according to an inverse time factor, a control member and an output member for each of the variable speed devices, an input shaft displaced according to said rate, means for displacing the control member of the smoothing variable speed device jointly controlled by the input shaft and the output member of the prediction variable speed device, means for displacing the control member of the prediction variable speed device jointly controlled by the output members of both variable speed devices, the arrangement being such that the displacement of the control member of the prediction variable speed device is proportional to the rate of displacement of the input shaft.

2. A circuit for predicting a future coordinate of a target which comprises a smoothing variable speed device actuated at constant speed, a prediction variable speed device actuated according to the reciprocal of time of flight of a projectile, a control member and an output member for each of the variable speed devices, an input shaft continuously displaced according to a changing coordinate of the present position of the target, a differential mechanism for displacing the control member of the smoothing variable speed device having a pair of input members, one being actuated by the input shaft and the other by the output member of the prediction variable speed device, a second differential mechanism for displacing the control member of the prediction variable speed device having a pair of input members actuated respectively by the output members of the variable speed devices, the arrangement being such that the displacement of the control member of the prediction variable speed drive represents prediction.

3. A circuit for predicting the future position of a target which comprises a smoothing variable speed device actuated at constant speed, a prediction variable speed device actuated at a speed inversely proportional to the time of flight of a projectile, a control member and an output member for each of the variable speed devices, an input shaft continuously displaced in accordance with a changing coordinate of the present position of a target, a differential mechanism for displacing the control member of the smoothing variable speed device having a pair of input members activated respectively by the input shaft and the output member of the prediction variable speed device, a second differential having an output member for displacing the control member of the prediction variable speed device, and a pair of input members actuated respectively by the output members of the variable speed devices, a third differential mechanism having a pair of input members actuated respectively by the input shaft and the output member of the second differential, and an output shaft for the third differential, the arrangement being such that the last mentioned shaft is displaced according to a coordinate of the future position of the target.

4. A circuit for predicting the future position of a target which comprises a smoothing variable speed device actuated at constant speed, a prediction variable speed device actuated at a speed inversely proportional to time of flight of a projectile, a control member and an output member for each of the variable speed devices, an input shaft continuously displaced in accordance with a changing coordinate of the present position of a target, a subtracting differential mechanism having a pair of input members actuated respectively by the input shaft and the output member of the prediction variable speed device for displacing the control member of the smoothing variable speed device, a second subtracting differential having an output member for displacing the control member of the prediction variable speed device, and a pair of input members actuated respectively by the output members of the variable speed devices, an adding differential mechanism having a pair of input members driven respectively by the input shaft and the output member of the second differential, and an output shaft therefor, the arrangement being such that the displacement of the last mentioned shaft is in accordance with a coordinate of the future position of the target.

5. A circuit for predicting a future coordinate of a target which comprises an input member continuously displaced according to a changing coordinate of the present position of a target, a first and a second variable speed device, each variable speed device having a control member and an output variable rate member, means for actuating said first variable speed device at a constant speed, means for actuating said second variable speed device at a speed inversely proportional to the projectile time of flight, means for displacing the control member of said first variable speed device in accordance with the difference in displacements of the input member and the output member of said second variable speed device, and means for displacing the control member of said second variable speed device in accordance with the difference in displacements of the output members of said first and second variable speed devices, the arrangement being such that the displacement of the control member of said second variable speed device represents prediction.

6. A circuit for predicting the future position of a target which comprises a movable input member continuously displaced in accordance with a changing coordinate of the present position of a target, a first and a second variable speed device, each variable speed device having a control member and an output variable rate member, means for actuating said first variable speed device at a constant speed, means for actuating said second variable speed device at a speed inversely proportional to the projectile time of flight, means for displacing the control member of said first variable speed device in accordance with the difference in displacements of said input member and the output member of said second variable speed device, means for displacing the control member of said second variable speed device in accordance with the difference in displacements of the output members of said first and second variable speed devices, an output shaft, and means for displacing the output shaft in accordance with the sum of the displacements of said input member and the control member of said second variable speed device, the arrangement being such that the displacement of the output shaft represents a coordinate of the future position of the target.

WILLARD L. BAKER.
DAVID J. CAMPBELL.
ALBERT P. GOOD.

REFERENCES CITED

The following references are of record in the file of this patent:

UNITED STATES PATENTS

| Number | Name | Date |
| --- | --- | --- |
| 2,206,875 | Chafee et al. | July 9, 1940 |

Certificate of Correction

Patent No. 2,426,584. September 2, 1947.

WILLARD L. BAKER ET AL.

It is hereby certified that error appears in the printed specification of the above numbered patent requiring correction as follows: Column 4, line 19, for that portion of the equation reading "$\alpha x_o \cdot {}^t_p$," read $\alpha \dot{x}_o \cdot t_p$; and that the said Letters Patent should be read with this correction therein that the same may conform to the record of the case in the Patent Office.

Signed and sealed this 2d day of December, A. D. 1947.

[SEAL]

THOMAS F. MURPHY.
*Assistant Commissioner of Patents.*